United States Patent
Niermann et al.

(10) Patent No.: US 9,011,618 B2
(45) Date of Patent: Apr. 21, 2015

(54) METHOD FOR APPLYING ADHESIVE ACCORDING TO TOLERANCE IN VEHICLE CONSTRUCTION

(75) Inventors: Dirk Niermann, Lillenthal (DE); Holger Frauen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/231,224

(22) Filed: Sep. 13, 2011

(65) Prior Publication Data
US 2012/0043009 A1 Feb. 23, 2012

Related U.S. Application Data

(63) Continuation of application No. PCT/EP2010/053512, filed on Mar. 18, 2010.

(30) Foreign Application Priority Data

Mar. 19, 2009 (DE) .......... 10 2009 013 541
Mar. 8, 2010 (DE) .......... 10 2010 010 685

(51) Int. Cl.
*B29C 65/48* (2006.01)
*B05C 11/10* (2006.01)
(Continued)

(52) U.S. Cl.
CPC .......... *B05C 11/1021* (2013.01); *B05C 5/0216* (2013.01); *B05C 13/02* (2013.01); *B29C 65/54* (2013.01); *B29C 65/7838* (2013.01); *B29C 66/61* (2013.01); *B29C 66/721* (2013.01); *B29C 66/863* (2013.01); *B29C 66/90* (2013.01); *B29K 2105/06* (2013.01); *B29K 2307/00* (2013.01);

*B29L 2031/3082* (2013.01); *B29L 2031/737* (2013.01); *B64F 5/0009* (2013.01); *B29C 65/546* (2013.01);
(Continued)

(58) Field of Classification Search
USPC ........ 156/64, 94, 98, 286, 351, 367; 264/36.1, 36.22; 29/402.09, 402.11; 382/108
See application file for complete search history.

(56) References Cited

U.S. PATENT DOCUMENTS 5,738,749 A 4/1998 Grimshaw et al.
6,017,484 A 1/2000 Hale
(Continued)

FOREIGN PATENT DOCUMENTS

CN 1826451 8/2006
CN 101272956 9/2008
(Continued)

OTHER PUBLICATIONS

International Search Report and Written Opinion dated May 19, 2010 for PCT/EP2010/053523 (WO2010/106129).
(Continued)

*Primary Examiner* — George Koch
(74) *Attorney, Agent, or Firm* — Jenkins, Wilson, Taylor & Hunt, P.A.

(57) ABSTRACT

A method for adhesive application in vehicle construction during joining of joining partners which are subject to tolerances comprises the following steps:
  detecting the geometric data of the joining partners in an automated manner,
  detecting the joint gap dimensions of the joining partners from the detected geometric data,
  joining the joining partners in the joining position thereof, and
  applying the adhesive in the joint gap.

5 Claims, 3 Drawing Sheets

(51) Int. Cl.
    *B29C 65/54*     (2006.01)
    *B05C 5/02*     (2006.01)
    *B05C 13/02*     (2006.01)
    *B29C 65/78*     (2006.01)
    *B29C 65/00*     (2006.01)
    *B29K 105/06*     (2006.01)
    *B29K 307/00*     (2006.01)
    *B29L 31/30*     (2006.01)
    *B29L 31/00*     (2006.01)
    *B64F 5/00*     (2006.01)

(52) U.S. Cl.
    CPC ........... *B29C 66/53241* (2013.01); *B29C 65/48* (2013.01); *B29C 65/483* (2013.01); *B29C 65/485* (2013.01); *B29C 65/488* (2013.01); *B29C 65/4885* (2013.01)

(56) References Cited

U.S. PATENT DOCUMENTS

| | | | |
|---|---|---|---|
| 7,279,056 B2 | 10/2007 | Weisser | |
| 7,410,352 B2 | 8/2008 | Sarh | |
| 7,909,952 B2 | 3/2011 | Kato | |
| 8,515,424 B2 | 8/2013 | Tinnakornsrisuphap et al. | |
| 2004/0236454 A1* | 11/2004 | Weisser | 700/123 |
| 2005/0039843 A1* | 2/2005 | Johnson et al. | 156/175 |
| 2005/0247396 A1 | 11/2005 | Oldani et al. | |
| 2006/0108058 A1 | 5/2006 | Chapman et al. | |
| 2007/0034197 A1 | 2/2007 | Tschech | |
| 2007/0241478 A1* | 10/2007 | Buckley | 264/257 |
| 2008/0230652 A1 | 9/2008 | Biornstad et al. | |
| 2008/0256788 A1 | 10/2008 | Glazebrook | |
| 2009/0151852 A1 | 6/2009 | Roebroeks | |
| 2009/0154775 A1* | 6/2009 | Lea et al. | 382/108 |
| 2011/0142663 A1* | 6/2011 | Gill | 416/226 |
| 2011/0277935 A1* | 11/2011 | Borgmann et al. | 156/350 |
| 2012/0043008 A1* | 2/2012 | Niermann et al. | 156/64 |

FOREIGN PATENT DOCUMENTS

| | | |
|---|---|---|
| DE | 10 2007 061429 A1 | 7/2009 |
| EP | 1004361 A2 | 5/2000 |
| FR | 2912680 | 8/2008 |
| JP | 58-187479 | 11/1983 |
| JP | 2003-513821 | 4/2003 |
| JP | 2004-331054 | 11/2004 |
| JP | 2008-502217 | 1/2008 |
| JP | 2008-143480 | 6/2008 |
| JP | 2009-508755 | 3/2009 |
| JP | 2010/519120 | 6/2010 |
| RU | 2329183 | 7/2008 |
| SU | 137015 | 5/1960 |
| WO | WO 01/34381 | 5/2001 |
| WO | WO 2004/076769 | 9/2004 |
| WO | WO 2005/119990 | 12/2005 |
| WO | WO 2007/034197 | 3/2007 |
| WO | WO 2008/129156 | 10/2008 |
| WO | WO 2010/014333 | 2/2010 |
| WO | WO 2010/106123 A | 9/2010 |
| WO | WO 2010/106129 A1 | 9/2010 |

OTHER PUBLICATIONS

International Search Report and Written Opinion dated May 20, 2010 for PCT/EP2010/053512 (WO2010/106123 A).
Non-Final Office Action for U.S. Appl. No. 13/221,279 dated Apr. 25, 2012.
Office Action with Restriction/Election Requirement for U.S. Appl. No. 13/221,279 dated Mar. 20, 2012.
Japanese Office Action for Application No. 2012-500252 dated Mar. 8, 2013.
Russian Decision to Grant for Application No. 2011139569/11 dated Nov. 21, 2012.
Japanese Office Action for Application No. JP 2012-500250 dated Dec. 3, 2012.
Chinese Office Action for Application No. 201080012439.1 dated Dec. 5, 2012.
Non-Final Office Action for U.S. Appl. No. 13/221,279 dated Mar. 17, 2014.
Final Office Action for U.S. Appl. No. 13/221,279 dated Jul. 15, 2013.
Japanese Notice of Allowance for Application No. 2012-500250 dated Aug. 28, 2013.
Notice of Allowance for U.S. Appl. No. 13/221,279 dated Aug. 30, 2011.
Interview Summary for U.S. Appl. No. 13/221,279 dated Jul. 8, 2014.

* cited by examiner

METHOD FOR APPLYING ADHESIVE ACCORDING TO TOLERANCE IN VEHICLE CONSTRUCTION

CROSS-REFERENCE TO RELATED APPLICATIONS

This application is a continuation of and claims priority to PCT/EP2010/053512 filed Mar. 18, 2010 which claims the benefit of and priority to German Patent Application No. 10 2009 013 541.3, filed Mar. 19, 2009 and German Patent Application No. 10 2010 010 685.2, filed Mar. 8, 2010, the entire disclosures of which are herein incorporated by reference.

FIELD OF THE INVENTION

The invention relates to a method for tolerance-adapted adhesive application in vehicle construction, in particular in the construction of aircraft fuselages for large aircraft and a corresponding device.

In recent years, modern lightweight constructions have significantly changed vehicle construction, whether of ships, aircraft, cars or railway vehicles. Thus, the use of suitable materials leads to improvements in terms of weight, safety and comfort, with cost savings also being possible at the same time. In addition to the use of suitable materials, this progress has been achieved through the intelligent use of modern adhesive technology, it being possible to combine the adhesive technology with the conventional joining technologies such as riveting, screwing or spot welding.

Meanwhile, the adhesive technology has also found its way into aircraft construction. Thus, the fuselage of large aircraft is joined substantially manually in a shell construction. In correspondingly large devices, the fuselage of an aircraft is equipped with stringers, formers, passenger and cargo floors, door and freight door frames and window frames in partially mechanised and in part in manual assembly steps, before the outer skin is closed.

Structural connections are joined by riveting or by a combination of riveting and adhesive bonding, also referred to as rivet-bonding. Panels and fuselage segments and the inserted components are interconnected by riveting, liquid shim materials which fill the slightly irregular gap remaining between the joining parts during riveting being applied before joining. The shim materials are generally two-component epoxy resins which have a gap-filling capacity of approximately 2-3 mm and a curing time of 8 h at room temperature.

Larger gaps are compensated manually in a time-consuming manner by means of solid shim made of fibre composite material. A combination of liquid and solid shim materials can also be used. As a whole, the processing of the shim materials is carried out substantially manually and is very time-consuming, in particular since the joining partners are temporarily joined to determine the gap dimensions and the joining partners must then be moved apart from one another again.

An example of the construction of large aircraft in shell construction can be derived from DE 10 2007 061 429 A1, from which a fuselage structure of an aircraft is known. In this case, the fuselage structure comprises an outer skin, structural components such as stringers and formers which are connected to the outer skin, and an inner lining. The structural components are adhesively bonded, riveted and/or welded to the outer skin, and the inner lining and the outer skin and the structural components thereof together form a carrying connection. In this case, the inner lining can also be connected to the structural components and/or the outer skin by means of an adhesive joint.

The adhesion systems and adhesion technologies which have so far been used in the aviation field do not allow rapid, automated joining by adhesion of the fuselage and fitted components and compensation of tolerances over 2 mm without additional solid shim.

SUMMARY OF THE INVENTION

The object of the invention is therefore to provide a method and a corresponding device for adhesive application in the assembly of large structures in vehicle construction, in particular in aircraft construction, whereby manual production can be avoided as much as possible in such a way that greater productivity is achieved.

This object is achieved by a method with the features of claim 1 and by a device with the features of claim 9. Preferred embodiments of the invention are the subject-matter of the dependent claims.

The method according to the invention for adhesive application in vehicle construction during joining of joining partners which are subject to tolerances comprises the following steps:
  detecting the geometric data of the joining partners in an automated manner,
  detecting the joint gap dimensions of the joining partners from the detected geometric data,
  determining the amount of the adhesive to be applied on the basis of the joint gap dimensions,
  joining the joining partners in the joining position thereof, and
  applying the adhesive in the joint gap during or after joining of the joining partners.

In aircraft construction, the joining partners, such as fuselage elements and fuselage segments, and the components to be fitted are subject to tolerances. The geometries of the joining partners can be detected by modern measuring methods and the gap dimensions for adhesive joining can be determined from the detected digital data with sufficient accuracy. Applying the adhesive in the joint gap after or during joining of the joining partners makes it possible to join the joining partners in an automated manner. Further, since temporary joining of the joining partners for determining the gap dimensions is omitted, a high production rate is possible.

The amount of adhesive to be applied is preferably determined on the basis of the joint gap dimensions. It is thus ensured that the adhesive joint is sufficient for the desired stability conditions and that adhesive is used economically.

The adhesive is preferably applied in the joint gap when the final joining position is reached. The adhesive is distributed and thus fills a portion of the joint or the entire joint. The flow required for this purpose of the adhesive can be achieved by means of its composition, gravitational force, centrifugal force, magnetic and/or electrical fields, low pressure in the joint, temperature control of the joining partners and/or the adhesive or a combination of the mentioned parameters. The required adhesive is thus applied in the finished joint gap and for example the immediate curing of the adhesive can be initiated via further measures.

However, the application of the adhesive in the joint gap can also take place or start when the distance of the joining partners from the final joining position is less than a predetermined amount. Thus, it is possible to move the joining partners into a temporary position, apply the adhesive and then bring the joining partners into the final position. This variant may be expedient when accessibility of the joint gap in the final position is made difficult, in such a way that the adhesive must be brought into a temporary position. It is also possible to start the application of the adhesive in a temporary gap position and bring the joining partners into the final joining position during the adhesive application. This variant is associated with a time saving and the efficiency of the method is increased.

In this case, too, the flow required for this purpose of the adhesive can be achieved by means of its composition, gravitational force, centrifugal force, magnetic and/or electrical fields, low pressure in the joint, temperature control of the joining partners and/or the adhesive or a combination of the mentioned parameters.

The adhesive is preferably applied laterally in the bonding gap and/or in the joint gap through application openings in one or both joining partners.

More preferably, the joint gap can comprise lateral or surface-edge limiting elements in order to prevent the adhesive applied in the joint gap from escaping. As a result, uncontrolled leakage of adhesive from the bonding gap is avoided. These limiting elements can remain at the bonded joint after curing or can be removed once a sufficient mechanical stability of the bonded joint has been reached. In the case that the elements remain, they can consist of a second adhesive. This second adhesive can be applied to one or both of the adhered surfaces at a time before, while or after the joining partners are brought into the final joining position. This second adhesive can be cured together with the adhesive applied in the joint gap or separately therefrom. In the case that the limiting elements are removed, they can comprise a non-adhesive surface, which for example can be obtained by means of the material used or a laminated film.

Before the joining partners are joined together, the joint faces of the joint gaps or joints are preferably subjected to an automated pretreatment to optimise the quality in terms of adhesion and the quality thereof in terms of adhesion is determined. An optimum bonding result is thus achieved.

In particular, in aircraft construction the joining partners are formed by fuselage segments and structural components such as formers, stringers, etc. for constructing a fuselage structure.

The device according to the invention for carrying out the above-described method comprises:

- a component carrier comprising a component seat for receiving a first joining partner,
- a central carrier for receiving at least an integration tool,
- an integration tool for receiving and introducing the further joining partner to be introduced into the first joining partner,
- a measuring system for detecting the geometric data of the joining partners and for calculating the joint gaps,
- at least an application tool for applying the adhesive, and
- a control system for controlling the device.

The device preferably comprises further tools for surface treatment and/or for surface monitoring and/or for curing the adhesive. In this case, individual tools can be used for processing the components to be fitted, while further tools are designed to be received on the central carrier, in order to be able to process and/or measure the first joining partner arranged on the component carrier. These tools can be designed as robots which, according to requirements, have corresponding spatial degrees of freedom.

BRIEF DESCRIPTION OF THE DRAWINGS

A preferred embodiment of the invention will be described below with reference to the drawings, in which.

DESCRIPTION OF EXEMPLARY EMBODIMENTS

Figure 1:
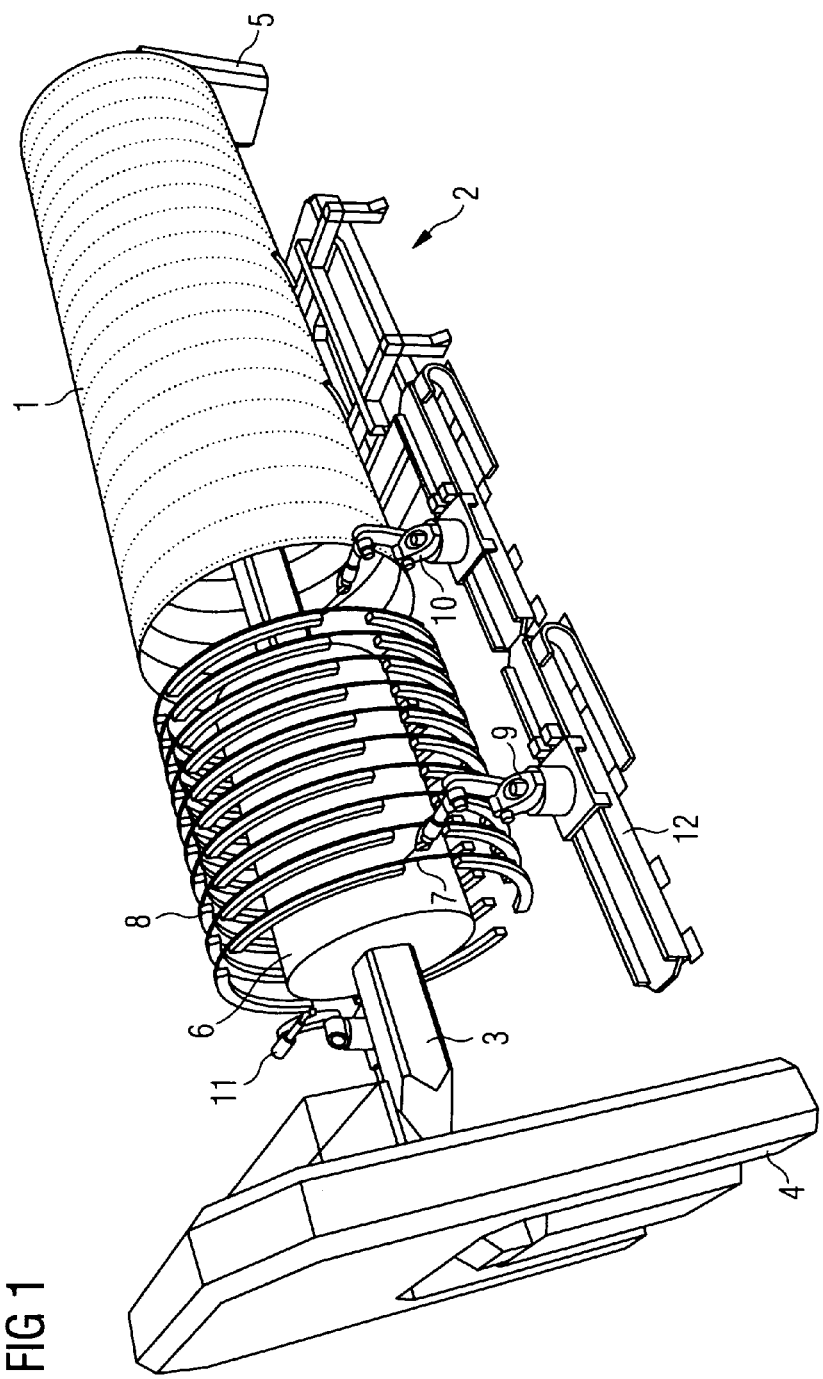
FIG. 1 is a first perspective view of the device according to the invention comprising a tool for fitting formers which is guided via a central carrier.

FIG. 1 is a schematic view of the device according to the invention for the structural completion of fuselage segments based on the central carrier principle, the device holding ready technologies and systems for largely parallelised fitting of formers, passenger and cargo floors, door and freight door frames and window frames in the fitted fuselage segment. A fuselage segment 1 is mounted on a movable component carrier 2, the component carrier 2 comprising an automated component seat and systems for correcting shape and position (not shown). A central carrier 3, which is supported on each side by rigid and lowerable supports 4, 5, extends inside the fuselage segment 1 when the fuselage segment 1 is in the fitted state.

Depending on the fitting operation, different integration tools 6 are guided on the central carrier 3, which is supported by the rigid and lowerable supports 4, 5 and can for example have a length of approximately 22 m. The central carrier 3 can be retracted telescopically to bring the barrel-shaped fuselage segment 1 shown in FIG. 1 into the device. The fuselage segment 1 is brought into the device lying on the movable component carrier 2. The component carrier 2 has a functionality for correcting the position of the fuselage segment 1 and tensioning devices with which the shape of the fuselage segment 1 can be fixed and optionally corrected. Once the fuselage segment 1 has been introduced, the central carrier 3 can be moved back out to the rear support 5. The respectively required integration tool 6, which is already prefitted outside the system and in the example is equipped with formers 7 to be fitted, is then mounted.

In order to achieve a high level of parallelisation of assembly steps, as many of the above-mentioned components as possible per process step and per tool are to be fitted simultaneously.

The integration tool 6 equipped with the components to be introduced is moved into the fuselage segment 1 via the central carrier 3 as a guide means and orientates itself optically in space, in such a way that the former flange surface 8 later represents the zero reference point.

The components to be fitted, in this case the formers 7, are then brought simultaneously into their precise joining positions by folding, placing or radial expansion processes of the integration tool 6. A possible combination is for example the simultaneous introduction of formers 7 and floor (not shown).

The device further comprises modular tools 9, 10, 11, known as end effectors, which are movably arranged on a rail system 12, are used for surface treatment, surface monitoring, adhesive application and for curing the adhesive and for these tasks can be equipped with the corresponding tools, the corresponding equipment taking place automatically.

Figure 2:
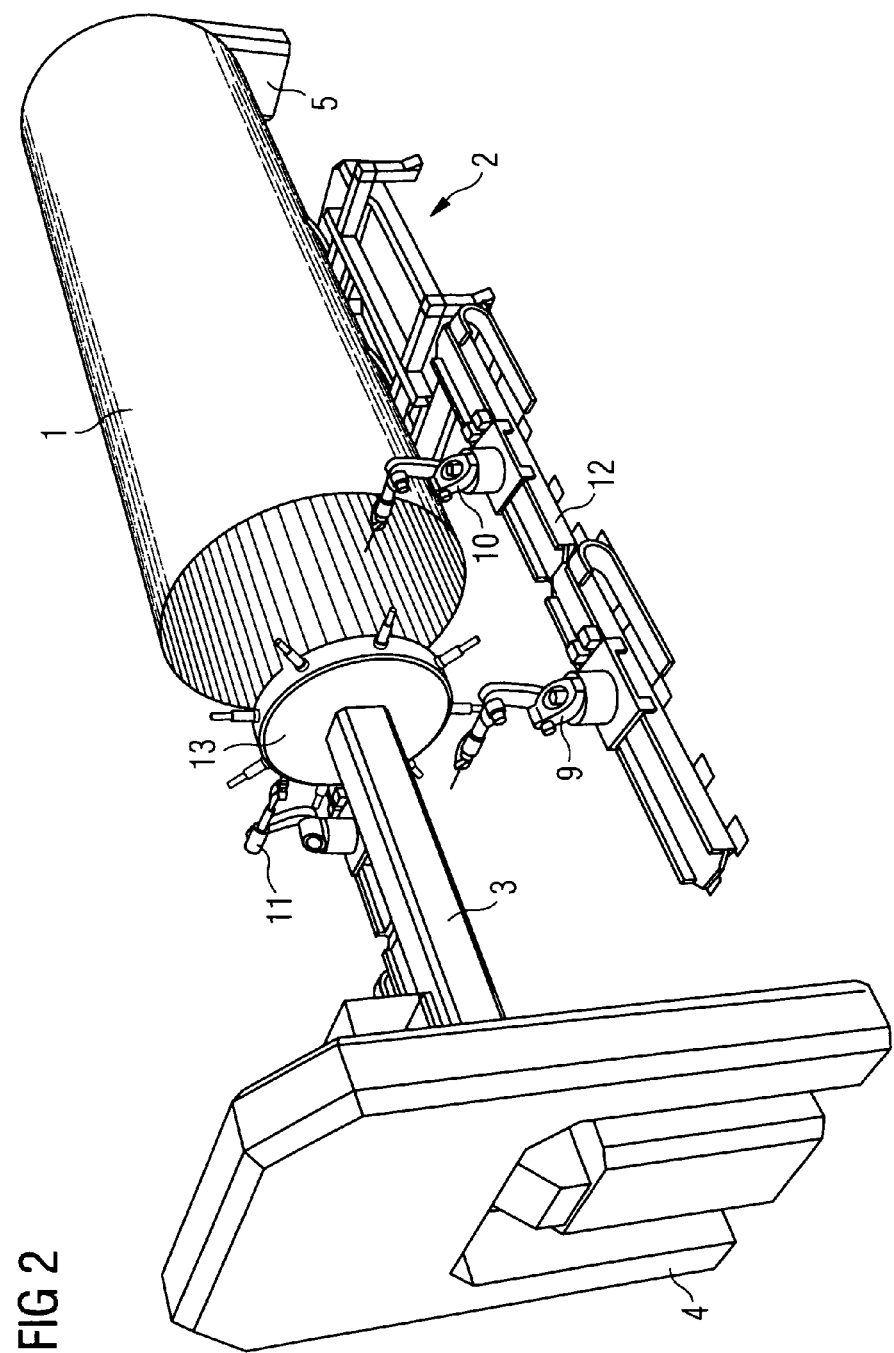
FIG. 2 is a second perspective view of the device comprising a further tool.

FIG. 2 shows the device of FIG. 1, a modular tool 13 being arranged on the central carrier 3, which tool is used to treat the joint faces in the fuselage segment 1 automatically to achieve an optimum bonding result. The modular tool 13 is also used to assess the pretreated joint faces with regard to the quality thereof in terms of adhesion. The modular tool 13 is moved into the fuselage segment 1 to pretreat and assess the joint faces.

As explained above, the approach in terms of joining is based on the use of adhesive bonding technology, without additional riveting being used for fixing. Should rivets be required at selected points, these are introduced later in another system. The function of the adhesive bonding during assembly is thus to fix the introduced components rapidly and compensate tolerances on the inner surface of the fuselage, which depending on the production technology may be subject to tolerances of varying strengths.

In addition to the fulfilment of a compensating and sealing function, the basic requirements placed on a CFRP structural adhesive for aviation applications include good processibility, which in particular is defined by long open times and assembly-compatible rheology, rapid curing and high pressure resistance, in order to avoid loosening in the cured joint owing to flow processes.

Therefore, the joint faces in the fuselage and on the components such as the exemplary formers are firstly pretreated automatically, in this case by the tool 13, and then tested by an automated monitoring method with regard to the quality thereof in terms of adhesion. As a result, the required pretreatment time is considerably reduced with substantially improved reproducibility in comparison to manual execution.

Figure 3:
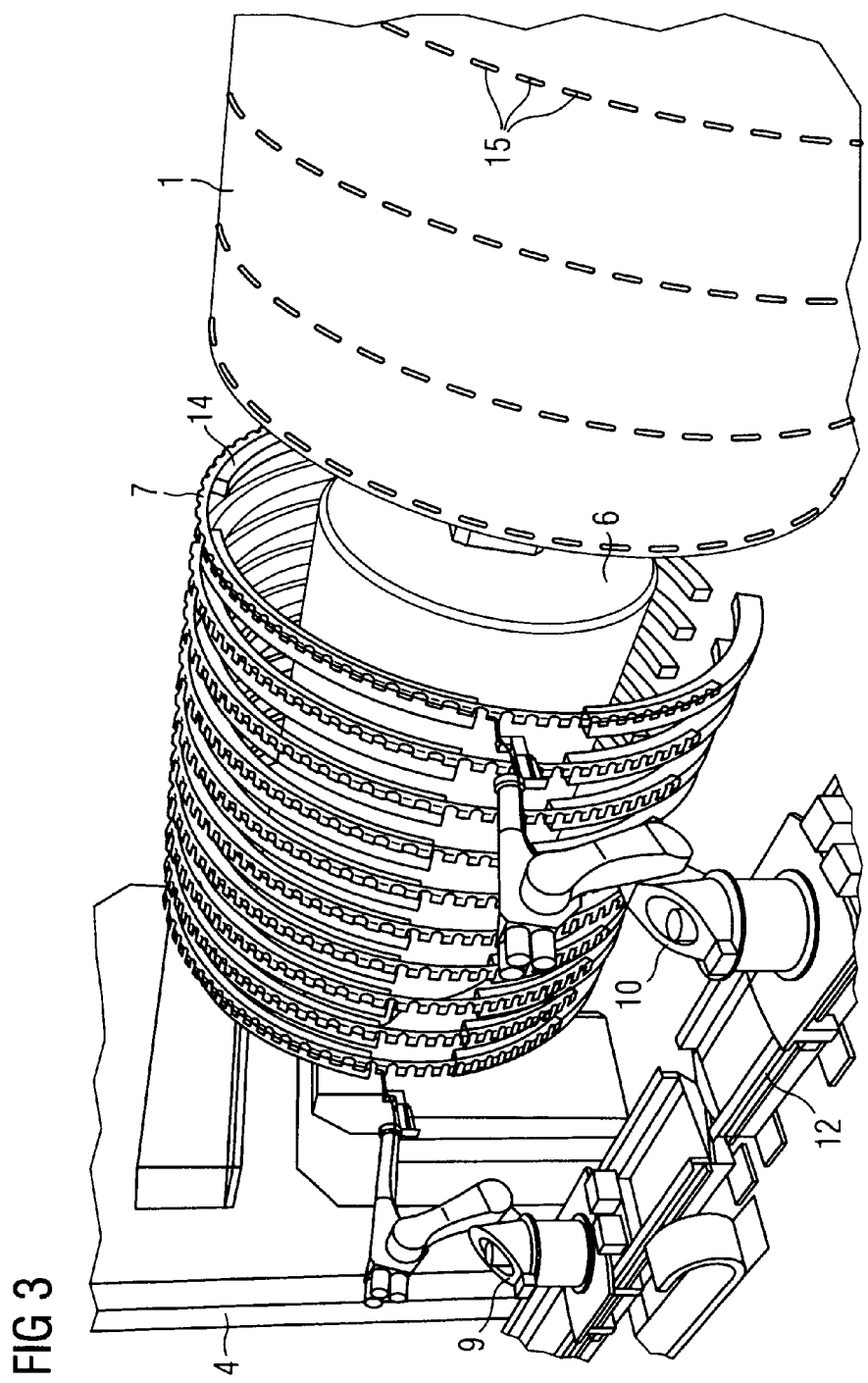
FIG. 3 is a view of a detail of the device according to FIG. 1.

FIG. 3 shows the process of the preparatory surface treatment of the formers 7 by means of the modular tools 9 and 10. In this case, the formers 7 are arranged on schematically shown receivers 14. After the preparatory surface treatment, the integration tool 6 together with the fitted formers is brought into the fuselage structure 1 and the formers 7 are brought automatically into the joining position by means of the receiver 14 of the integration tool 6. The adhesive is then introduced into the respective joint gaps through application openings 15 arranged in the fuselage structure.

LIST OF REFERENCE NUMERALS

1 fuselage segment
2 component carrier
3 central carrier
4 front support
5 rear support
6 integration tool
7 formers
8 former flange surface
9 modular tool
10 modular tool
11 modular tool
12 rail system
13 modular tool
14 receiver
15 application opening

The invention claimed is:

1. A method for adhesive application in vehicle construction during joining of joining partners which are subject to tolerances, wherein the adhesive is capable of flowing such that it distributes in and fills a joint gap of the joining partners, comprising:
   detecting the geometric data of the joining partners in an automated manner,
   detecting the joint gap dimensions of the joining partners from the detected geometric data,
   determining the amount of the flowable adhesive to be applied on the basis of the joint gap dimensions,
   joining the joining partners in the joining position thereof,
   applying the flowable adhesive in the joint gap in a temporary gap position and bringing the joining partners into the final position, or applying the flowable adhesive in the joint gap when the final joining position is reached, wherein the flowable adhesive distributes in the joint gap and fills the joint gap, and
   applying lateral or surface-edge limiting elements consisting of a second adhesive to at least one adhered surface of a joining partner in the joint gap, wherein the lateral or surface-edge limiting elements prevent the flowable adhesive applied in the joint gap from escaping, wherein the lateral or surface-edge limiting elements remain at the bonded joint after curing, and wherein the second adhesive is cured together with the adhesive applied in the joint gap or separately therefrom.

2. The method according to claim 1, wherein the application of the flowable adhesive in the joint gap takes place or starts when the distance of the joining partners from the final joining position is less than a predetermined amount.

3. The method according to claim 1, wherein the flowable adhesive is applied laterally in the bonding gap and/or in the joint gap through application openings in the joining partners.

4. The method according to claim 1, wherein, before the joining partners are joined together, the joint faces of the joint gaps are subjected to an automated pretreatment to optimise the quality in terms of adhesion and the quality thereof in terms of adhesion is determined.

5. The method according to claim 1, wherein the joining partners are formed by fuselage segments and structural components for constructing a fuselage structure.

* * * * *